United States Patent
Davis et al.

[11] Patent Number: 5,885,047
[45] Date of Patent: *Mar. 23, 1999

[54] PNEUMATIC LEVEL MAINTAINING TRANSPORT

[75] Inventors: Michael F. Davis, Seattle; Richard M. Curtin; John Busuttil, both of Redmond, all of Wash.

[73] Assignee: Genie Industries, Inc., Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 759,564

[22] Filed: Dec. 4, 1996

[51] Int. Cl.⁶ ........................................................ B62B 1/12
[52] U.S. Cl. .................... 414/490; 280/47.28; 280/47.29
[58] Field of Search .......................... 414/490; 211/59.3; 108/136; 280/47.29, 47.28, 47.27; 187/234, 273

[56] References Cited

U.S. PATENT DOCUMENTS

| | | |
|---|---|---|
| 1,032,040 | 7/1912 | Atwood .............................. 187/273 X |
| 2,479,396 | 8/1949 | Nelson . |
| 2,626,727 | 1/1953 | Gibbs et al. . |
| 2,934,211 | 4/1960 | Shivek . |
| 3,052,323 | 9/1962 | Hopfeld .......................... 280/47.29 X |
| 3,072,219 | 1/1963 | Olson ................................. 187/234 X |
| 3,154,029 | 10/1964 | Bronson . |
| 3,763,965 | 10/1973 | Riekkinen ....................... 280/47.29 X |
| 4,049,329 | 9/1977 | Kolosov . |
| 4,435,115 | 3/1984 | Orstad et al. ......................... 414/490 |
| 4,652,202 | 3/1987 | Kersten . |
| 4,764,075 | 8/1988 | Cox et al. . |
| 5,122,027 | 6/1992 | Tabayashi .......................... 414/490 X |
| 5,251,922 | 10/1993 | Mann ................................. 414/490 X |
| 5,330,032 | 7/1994 | Warner ............................... 187/234 X |
| 5,464,315 | 11/1995 | Palmer et al. ..................... 414/490 X |
| 5,575,605 | 11/1996 | Fisher ...................................... 414/490 |
| 5,624,224 | 4/1997 | Brandenburg .......................... 414/490 |
| 5,810,117 | 9/1998 | Wood ................................. 187/273 X |

FOREIGN PATENT DOCUMENTS

| | | | |
|---|---|---|---|
| 141575 | 9/1950 | Australia ............................ 280/47.29 |
| 447839 | 3/1968 | Switzerland ....................... 280/47.29 |

Primary Examiner—David A. Bucci
Attorney, Agent, or Firm—Christensen O'Connor Johnson & Kindness, PLLC

[57] ABSTRACT

A transport device, or hand truck (10), having a load carrying surface (26) that is mounted to move up and down along the hand truck (10). The level of the load carrying surface (26) is changed by the amount of air within a pneumatic cylinder (40). The amount of air in the pneumatic cylinder (40) is determined by a pneumatic adjustment subsystem (42) and the load on the load carrying surface (26). Preferably, the pneumatic adjustment subsystem (42) is set so that the top item located on the load carrying surface (26) is always at waist level. The pneumatic adjustment system (42) permits the pneumatic cylinder (40) to be offset an incremental amount respective to items of identical weight and height being removed from or placed upon the load carrying surface (26). Thus, as items are removed from the load carrying surface (26), the load carrying surface indexes upward so that the top item is readily available at waist level.

16 Claims, 3 Drawing Sheets

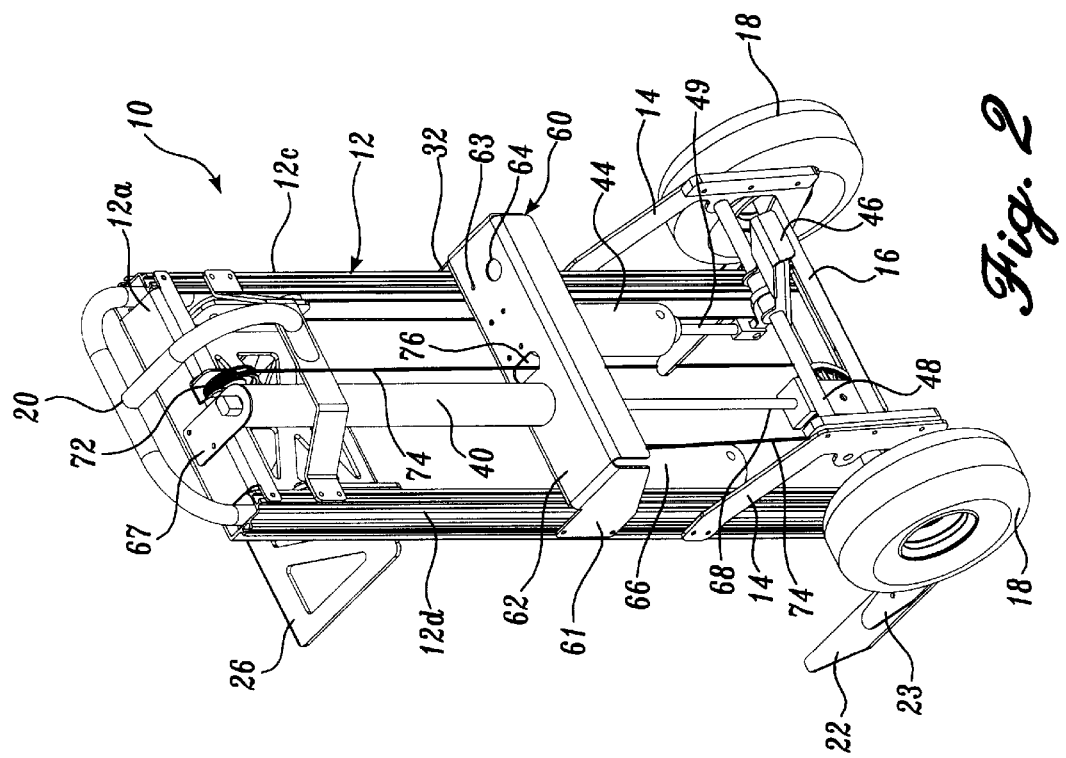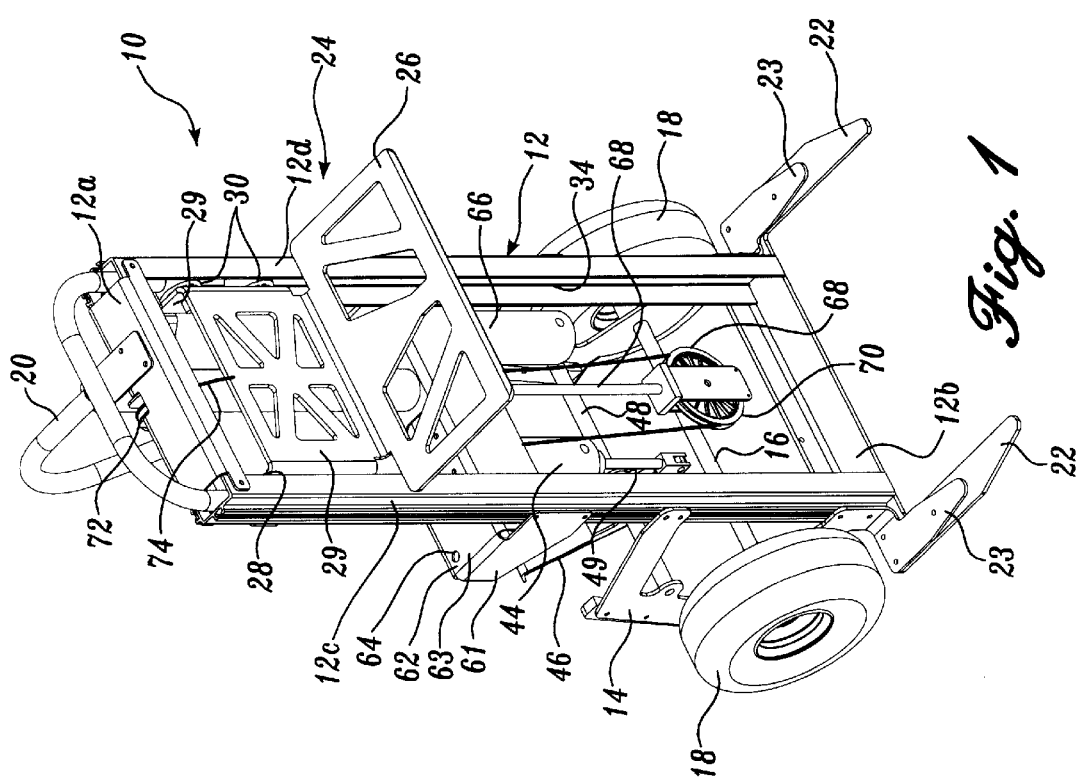

PNEUMATIC LEVEL MAINTAINING TRANSPORT

TECHNICAL FIELD OF THE INVENTION

This invention relates to transports, and, more specifically, level maintaining transports.

BACKGROUND OF THE INVENTION

The manual loading and unloading of goods from a transport, such as hand truck, is a common cause of back injury. Operators load a hand truck by lifting goods and placing them on the hand truck, starting at the lowest level of the hand truck, and continuing until the hand truck is full. After the goods are moved to an unloading location, the operator manually unloads the hand truck, starting from the top and working down as the level of the goods reduces. The removal and addition of the lowest items places the largest amount of strain on the back of an operator. The repetitive nature of the movement further intensifies the problem.

Delivery personnel in the beverage industry are particularly susceptible to back injuries. A typical delivery person manually loads a hand truck several times a day from bottom to top with cases of beverages to create a stack. The stack is delivered to dispenser machines or vendors, and the delivery person manually unloads each of the cases from the stack. Not only is loading and unloading lower level beverage cases difficult, it also places increased strain on the back of the operator, when compared to higher level beverage cases.

Many beverage delivery personnel utilize support belts worn around the waist to provide back support during lifting. Although the belts may support some of the strain placed upon the back, the belts do not alleviate the strain caused by leaning to low positions to load or unload beverage cases.

Thus, there exists a need for a more efficient, safer way of loading and unloading stacks of beverage cases and stacks of other items onto and from a transport so that an operator does not have to stoop to the lower positions to load and unload the transport. Preferably, such transport would be easy to use, and relatively inexpensive to manufacture.

SUMMARY OF THE INVENTION

The present invention provides a level maintaining system that is ideally suited for use with transports, such as the hand trucks used to transport a stack of beverage cases. The level maintaining system includes a moveable load carrying surface and a pneumatic cylinder having a piston. The pneumatic cylinder is arranged such that extension and retraction of a shaft attached to the piston moves the load carrying surface upward and downward as an element is removed from or added to a stack of elements, i.e., a load to be transported by the transport. The level maintaining system also includes a pneumatic adjustment subsystem. The pneumatic adjustment subsystem includes a volume formed by the volume of the chamber of the pneumatic cylinder located on the side of the piston remote from the shaft and, preferably, a supplemental volume created by a tank. The volume is pressurized to a level such that the addition or removal of an incremental element of the load, such as a case of beverages, causes the shaft to extend or retract by the amount necessary to maintain the top of the load level. The volume and pressure are interrelated such that the pneumatic cylinder approximates linear operation over the range of movement of the load carrying surface for the chosen load. The pressure is chosen such that the incremental weight of an element of the load corresponds to an incremental change in the length of the shaft, which translates into an incremental raising or lowering of the load that is equal to the height of an incremental element of the load. The volume and the pressure relationship for varying amounts of load is determined by the formula $P_1 V_1^K = P_2 V_2^K$, where $P_1$ and $V_1$ are the pressure and volume values for one load condition and $P_2$ and $V_2$ are the pressure and volume values for a different load condition and K is the compressibility constant for the chosen gas.

In accordance with other aspects of this invention, the pneumatic adjustment subsystem includes a pump for controlling the pressurizing of the volume defined by the volume of the chamber of the pneumatic cylinder on the side of the piston remote from the shaft and the volume of the supplemental tank. Controlling the volume pressurization allows the level maintaining system to be calibrated to the load.

In accordance with further aspects of this invention, the transport is a hand truck and the level maintaining system is affixed to the frame of the hand truck.

In accordance with yet other aspects of this invention, a pulley/cable system couples the outer end of the shaft to the movable load carrying surface.

As will be readily appreciated from the foregoing description, the invention provides a level maintaining system for a transport, such as a hand truck, that maintains the upper level of a load at a constant elevation as load elements are added to or removed from a stack of elements supported by the transport. Because the upper level is maintained at a generally constant level, a user of the invention is not required to bend over to add or remove lower elements from the stack. As a result, user back strain is reduced when compared to many prior art transports.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a left-side, front perspective view of a hand truck incorporating the present invention;

FIG. 2 is a right-side, rear perspective view of the hand truck of FIG. 1;

A DETAILED DESCRIPTION OF THE PREFERRED EMBODIMENT

Figure 3:
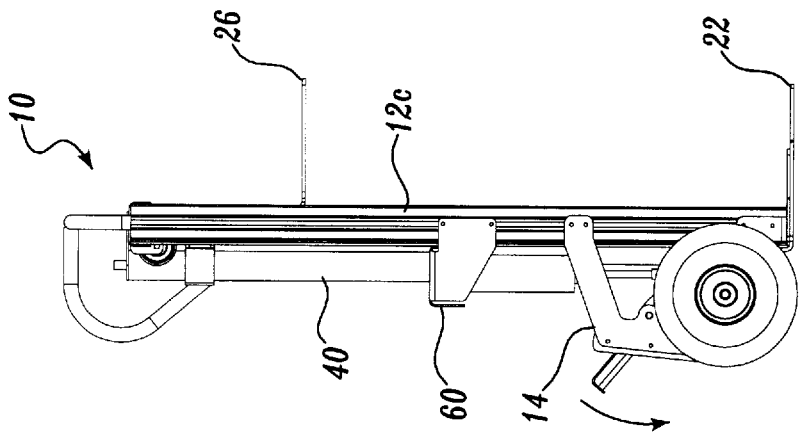
FIG. 3 is a left-side view of the hand truck of FIG. 1, with the load carrying surface completely lowered to the ground.

Referring now to the drawing, in which like reference numerals represent like parts throughout the several views, FIG. 1 shows a hand truck 10 embodying the present invention. The hand truck 10 includes a rectangular frame 12. The frame 12 includes a top rail 12a, a bottom plate 12b, a left side rail 12c, and a right side rail 12d. Two U-shaped axle frames 14 are attached on opposite sides of the lower end of the rectangular frame 12. More specifically, the first U-shaped axle frame 14 is attached to the outside of the right side 12d of the rectangular frame 12. The extended arms of the "U" of the U-shaped axle frame 14 are attached to the right side 12d of the rectangular frame 12 and the circular portion of the "U" extends orthogonally rearward from the rectangular frame. The second U-shaped axle frame 14 is attached in a similar manner to the left side 12c of the rectangular frame 12, and also extends orthogonally rearward from the rectangular frame 12.

An axle 16 that lies parallel to the bottom 12b of the rectangular frame 12, extends through the bottom of the two U-shaped axle frames 14. Wheels 18 are rotatably mounted on opposite ends of the axle 16, outside of the axle frame 14.

Attached at the top rail 12a of the rectangular frame 12 is a rounded T-grip handle 20, such as is known in the art. A pair of support arms 22 extend from opposite bottom edges of the bottom plate 12b of the rectangular frame. More specifically, the support arms 22 are integral with the bottom plate 12b, and extend from the outer junctures of the left side rail 12c and the bottom rail plate 12b, and the right side rail 12d and the bottom rail plate 12b. The support arms lie in a plane that extends orthogonally outwardly from the plane in which the rectangular frame 12 lies. The ends of the support arms 22 taper and narrow so as to aid in sliding the ends of the support arms under a load, as is well-known in the art.

As can be seen in FIG. 1, the U-shaped axle frames 14 may include extensions 23 that extend outwardly so as to overlap the support arms 22. The extensions 23 are bent from the bottom ends of the U-shaped axle frames 14 that are attached to the rectangular frame 12. The extensions 23 of the U-shaped axle frames 14 are shaped so as to extend along the support arms 22 and to add strength and support for the support arms 22.

The left and right side rails 12c, 12d of the rectangular frame 12 are U-shaped channels 32, 34 that open toward one another. A carrier 24 extends between the left and right side rails 12c and 12d. The carrier 24 includes a horizontal, load carrying surface 26 that is attached at a right angle to and extends outwardly from the front of a vertical plate 28. The vertical plate 28 includes right-angle extensions 29 along each side. The right-angle extensions 29 extend orthogonally rearwardly from the vertical plate 28 and face the channels 32, 34 formed by the left and right side rails 12c, 12d. A pair of wheels 30 are attached to each of the right-angle extensions 29. The wheels 30 are designed to roll in the channels 32, 34. The wheels 30 maintain the vertical plate 28 substantially aligned with the left and right side rails 12c, 12d of the rectangular frame 12, and align the load carrying surface 26 so that it extends orthogonally outwardly from the rectangular frame.

As will be described in detail below, the height of the carrier 24 is determined by the load on the load carrying surface 26 and a level maintaining system. The level maintaining system includes, a pneumatic cylinder 40, and a pneumatic adjustment subsystem 42. A schematic diagram of the pneumatic adjustment subsystem 42 and the pneumatic cylinder 40 is shown in FIG. 6.

The pneumatic adjustment subsystem 42 includes a foot pump 44. The foot pump 44 includes a pedal 46 mounted on one end of a lever arm 47. The center of the lever arm 47 is attached across a rod 48 that extends across the two U-shaped axle frames 14. Preferably, the rod 48 is located directly over the axle 16, or between the axle 16 and the rectangular frame 12. The benefit of this location is described in detail below. The other end of the lever arm 47 is attached to the outer end of the push rod 49 of the foot pump 44. A coil spring 50 (shown schematically in FIG. 6) biases the pedal into a "ready" position. In the ready position, the push rod 49 is, essentially, fully extended.

Figure 6:
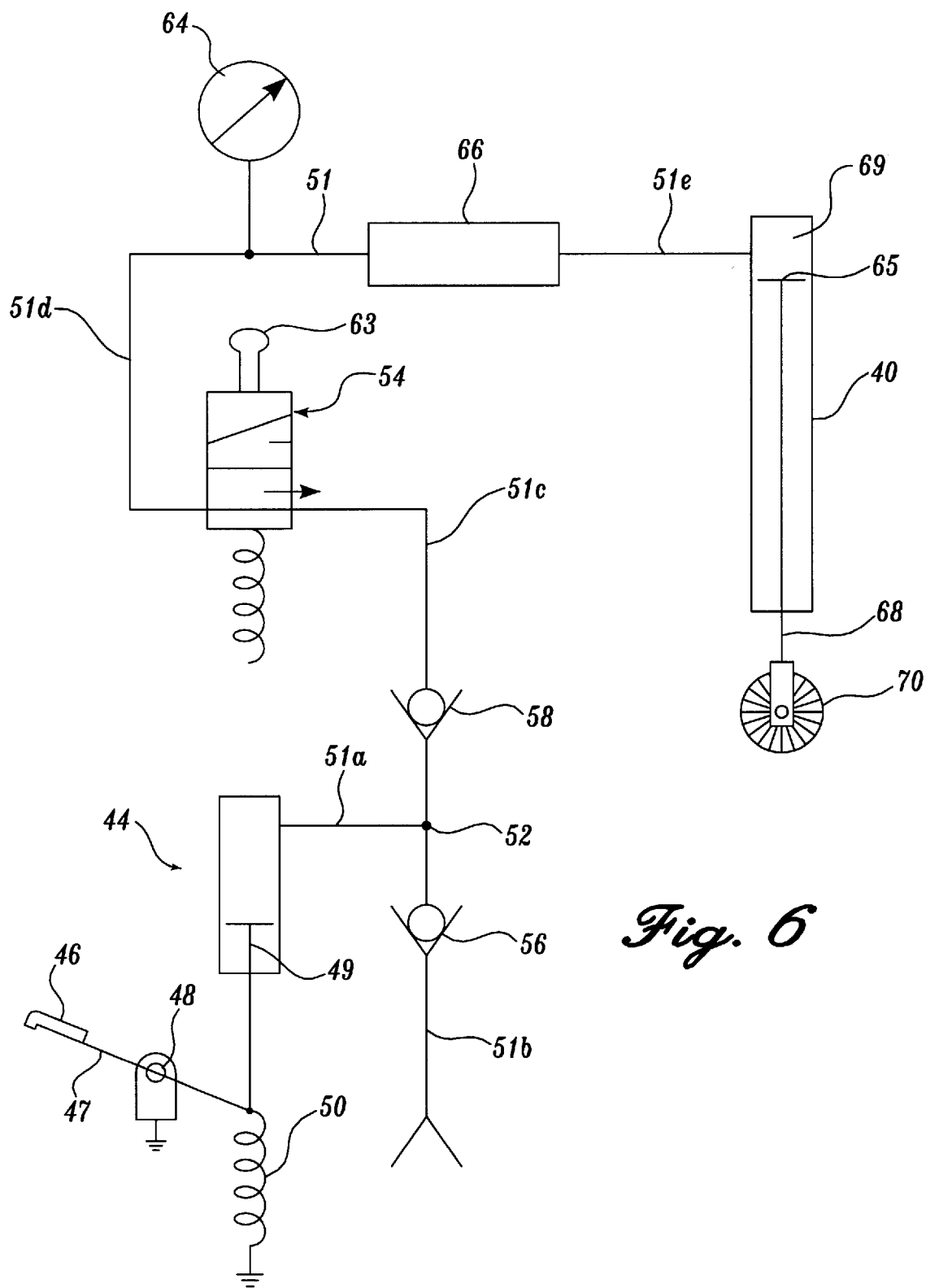
FIG. 6 is a schematic diagram of the pneumatic control circuit for the hand truck of FIG. 1.

As can best be seen in FIG. 6, a conduit 51a leads from the foot pump 44 to an intersection 52. A second conduit 51b leads from the intersection 52 in one direction to an intake 53. A third conduit 51c leads in the opposite direction to a relief valve 54. A first check valve 56 is located between the intersection 52 and the intake 53, and a second check valve 58 is located between the relief valve 54 and the intersection 52. Both check valves 56, 58 are biased closed, in the direction of the intake 53.

The relief valve 54 is a spring-loaded, two position relief valve that nominally connects the third conduit 51c to a fourth conduit 51d. When actuated, the relief valve 54 connects the fourth conduit 51d to an atmosphere exhaust port.

As shown in FIGS. 1 and 2, the relief valve 54 is mounted on a central bracket 60 that extends across the middle portion of the rectangular frame 12 parallel to the top rail 12a. The central bracket 60 includes a pair of mounting brackets 61 that are attached to (or integral with) a rectangular plate 62. The mounting brackets 61 extend to the outside of the left and right side rails 12c, 12d of the rectangular frame 12 and are attached thereto. The plane of the rectangular plate 62 lies orthogonal to the rectangular frame 12, out the rearward side of the hand truck 10. The relief valve 54 includes a release actuator 63 at its top that extends above the upper surface of the rectangular plate 62.

Returning to FIG. 6, a pressure gauge 64 is connected to the fourth conduit 51d. The pressure gauge 64 is also mounted on the rectangular plate 62. The fourth conduit 51d terminates at a storage tank 66 that extends downwardly from the bottom of the rectangular plate 62 along the right side of the hand truck 10. The storage tank 66 is connected by a fifth conduit 51e to the chamber 69 located at the end of the pneumatic cylinder 40 remote from the end from which a shaft 68 extends.

The end of the pneumatic cylinder 40 from which the shaft extends is attached to the top of the rectangular plate 62. The opposite end, i.e., the end to which the fifth conduit is connected, is attached to a bracket 67 (FIG. 2). The bracket 67 is a flat plate that extends orthogonally rearward from the top rail 12a of the rectangular frame 12. Thus, the pneumatic cylinder 40 is vertically oriented. The shaft 68 extends out of the bottom of the pneumatic cylinder 40, through a hole in the rectangular plate 62. A lower pulley 70 is attached to the distal end of the shaft 68. A second, upper pulley 72 is mounted in a bracket attached to the top rail 12a of the rectangular frame 12 (FIG. 2). A cable 74 extends from the top of the vertical plate 28 over the upper pulley 72 down through a hole 76 in the central bracket 60 (FIG. 2), around the lower pulley 70, and back up to the central bracket 60. The second end of the cable 74 is attached to the underside of the central bracket 60.

The carrier 24 is supported by the cable 74. When pressurized gas is supplied to the pneumatic cylinder 40 via the fifth conduit 51e, the shaft 68 is extended and the lower pulley 70 is moved downward, resulting in the carrier 24 being raised. Likewise, reducing the pressure of the gas in the pneumatic cylinder 40 allows the shaft 68 to retract in response to a load on the carrier 24, causing the carrier 24 to lower. The pressure of the gas in the pneumatic cylinder 40 is controlled by the pneumatic adjustment subsystem 42 and by the load on the load carrying surface 26. Preferably, the interrelationship between the gas pressure and the weight of the load is such that the top element of a stack of elements making up the load is always at waist level. The gas pressure/weight relationship is such that the shaft 68 of the pneumatic cylinder 40 is offset an incremental amount respective to items or elements of identical weight and height being removed from or placed upon the load carrying surface 26. Thus, as items are removed from the load carrying surface 26, the load carrying surface indexes upward so that the top item is readily available at waist level.

As is known, the shaft of a typical pneumatic cylinder is displaced a large amount by a predetermined amount of counteractive pressure applied to the distal end of the shaft when the shaft is extended at approximately its full length. This phenomenon is due largely to the fact that the gas within the chamber of the cylinder is under low pressure when the shaft is fully extended. In contrast, the shaft will move only relatively small amounts when the same amount of pressure is applied to the distal end of the shaft when the shaft is close to bottoming out in the cylinder. In this position, the gas within the chamber of the cylinder is almost completely compressed. Thus, the movement of a typical, pneumatic cylinder shaft relative to incremental amounts of counteractive pressure being applied to the shaft along the entire length of the shaft's stroke is not linear. In contrast, the movement of the shaft responsive to incremental amounts of counteractive pressure being applied to the shaft near the center of the shaft's stroke, is more closely linear. The present invention takes advantage of this substantial linearity.

The pneumatic adjustment subsystem 42 makes the movement of the shaft 68 more closely duplicate the near-linear central portion of the stroke of a pneumatic cylinder by adding extra volume to the chamber 69 on the side of the piston remote from the shaft 68. The extra volume is provided by the tank 66. The tank 66, in essence, increases the size of the chamber 69, extending the center, more linear region of the stroke of the shaft 68. When the chamber 69 of the pneumatic cylinder 40 is small, the tank prevents the piston 65 from "bottoming out".

The tank 66 and the chamber 69 are pressurized by the foot pump 44. The foot pump 44 supplies pressurized air to the storage tank 66 and the chamber 69 via the second check valve 58 and the relief valve 54. Pressurizing the chamber 69 of pneumatic cylinder 40 and the storage tank 66 produces a resistance that counteracts force applied to the end of the shaft 68. Increasing the effective volume of the chamber by pressurizing the chamber 69 and the storage tank 66 causes the shaft 68 to move in an approximate linear manner in response to incremental changes in load pressure applied to the load carrying surface 26. As items of equal weight and height are added to or removed from a stack of similar items on the load carrying surface 26, the shaft 68 of the pneumatic cylinder 40 moves the lower pulley 70 upward or downward by an incremental amount that maintains the top of the load at a fixed, e.g., waist level.

As described above, the pneumatic adjustment subsystem 42 is prepressurized by operation of the foot pump 44. An operator pumps the pedal 46 until the foot pump 44 has pressurized the storage tank 66 and the pneumatic cylinder 40 to a predetermined pressure. The predetermined pressure is read on the pressure gauge 64. As discussed earlier, the rod 48 that supports the lever arm 47 on which the pedal 46 is mounted is, preferably, located directly over the axle 16, or between the axle 16 and the rectangular frame 12. This positioning prevents the hand truck from tilting backward as the pedal 46 is being operated. Preferably, pressurization occurs when there is not a load on the load carrying surface 26. Otherwise, the pedal 46 may be too hard to pump by foot.

Figure 4:
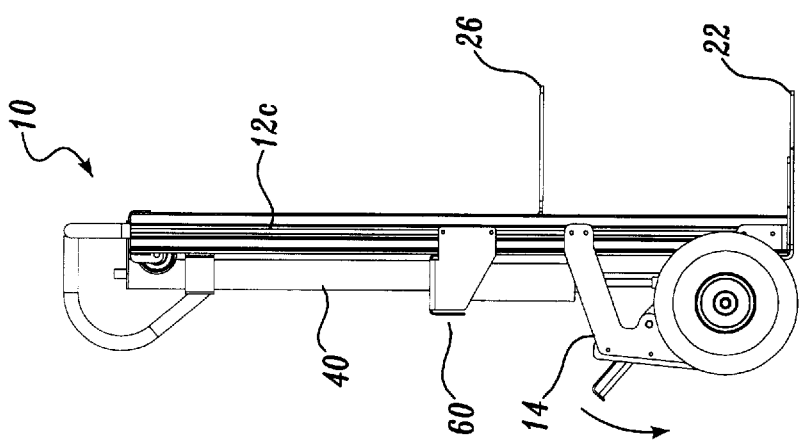
FIG. 4 is a left-side view of the hand truck of FIG. 1, with the load carrying surface in a partially raised position.
Figure 5:
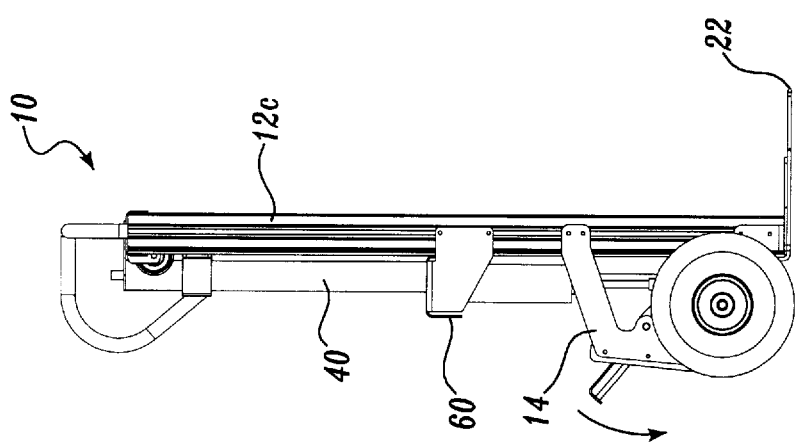
FIG. 5 is a left-side view of the hand truck of FIG. 1, with the load carrying surface at the fully raised position shown in FIG. 1.

As the pedal 46 is pumped, the load carrying surface 26 moves from the position shown in FIG. 3, through the position shown in FIG. 4, to the position shown in FIG. 5. Once the position shown in FIG. 5 has been reached, the load carrying surface 26 may be stacked with items to be transported by the hand truck. For best results, the items should be the same weight and height. An example of items that are suitable for stacking and transportation are cases of beverages.

As items are placed on the load carrying surface 26, the load carrying surface 26 lowers. Preferably, if the pneumatic adjustment subsystem 42 is pressurized correctly for the items to be transported, the top item of a stack of items located on the load carrying surface 26 is always at waist level. The pneumatic adjustment subsystem 42 causes the shaft 68 of the pneumatic cylinder 40 to move the load carrying surface 26 approximately the same amount as the height of the items of identical weight and height being placed upon the load carrying surface 26. Likewise, as items are removed from the load carrying surface 26, the load carrying surface indexes upward so that the top case is substantially always at waist level.

The amount that the load carrying surface 26 moves relative to items of identical weight and height being placed upon or removed from the load carrying surface is not exactly linear. There are losses in the system due to friction and heat dissipation from non-adiabatic gas compression. In addition, although the addition of the tank volume and the pressurization of the pneumatic cylinder chamber 69 and the tank volume causes the shaft 68 to move in a closely linear manner, movement is not precisely linear. Properly choosing a tank volume and system pressurization, allows the pneumatic adjustment subsystem 42 to maintain the top of the stack of items at substantially, but not exactly, the same level.

The relationship between the volume of the tank 66 and the pressure of the gas in the tank and the chamber can be represented by the following formula:

$$P_1 V_1^K = P_2 V_2^K$$

where

K=compressibility for gas in system, approximately 1.4 for air $P_1$=initial pressure of system $V_1$=initial volume of system $P_2$=final pressure of system $V_2$=final pressure of system This relationship can be used at several different points along the movement of the load-carrying surface 26 to calculate the proper initial pressure for a known tank and chamber volume for a known set of load conditions, i.e., the height and weight of the items to be stacked on the load carrying surface 26. The needed change in shaft length for a change in weight is readily translatable into this relationship. The differential pressure change created by adding or removing an item is related to the weight of the item. Shaft length change is related to volume change. Volume change is equal to the change in shaft length, times the cross-sectional area of the inside of the pneumatic cylinder 40. Thus, the pressure needed to support a known load stack at a given location can also easily be calculated.

A number of factors may have to be taken into account when using the foregoing relationship. The volume includes the volume of the storage tank 66 and the conduit leading from foot pump 44 to the storage tank, as well as the size of the chamber 69. Pressure losses may have to be taken into account. Thus, the relationship should be considered a guideline, recognizing that adjustments to the assembly may have to be made after an initial model is built. The applicants have found that a storage tank 66 having a volume of approximately 8 in³ used with a pneumatic cylinder 40 having a volume of 40.89 in³ works well for cases of beverages weighing 19.5 lbs. and having a 5 inch height. It is estimated that there is an additional approximately 1 in³ of volume in the conduit of the system. The pressure in the system is preferably about 35 psi. when the load carrying surface is raised and carries no load (FIG. 5).

Pressure on the system is released by pressing the release actuator 63. When the release actuator is pressed, the relief valve 54 begins releasing pressurized air from the storage tank 66. Continuing to depress the release actuator 63 continues the release of pressure in the storage tank 66.

Although the hand truck 10 described may be used with items of different sizes and weights, for maximum benefit of the level maintaining features of the invention, it is preferred that the items be of substantially the same height and weight. In addition, although the level maintaining features have been described in detail with reference to a hand truck 10, it is to be understood that the benefits of this invention may be advantageously employed in other devices.

While the preferred embodiment of the invention has been illustrated and described, it will be appreciated that various changes can be made therein without departing from the spirit and scope of the invention as defined in the appended claims.

The embodiments of the invention in which an exclusive property or privilege is claimed are defined as follows:

1. A level maintaining system comprising:
    a moveable load carrying surface;
    a pneumatic cylinder including a piston, a shaft, and a chamber, said shaft extending out one end of said pneumatic cylinder, the pneumatic cylinder being arranged such that extension and retraction of the shaft controls the height of the load carrying surface;
    a tank in fluid communication with the chamber;
    a pump configured for introducing a pressurized gas into the tank and the chamber; and
    a pneumatic adjustment subsystem, the pneumatic adjustment subsystem including a predetermined amount of gas that is pressurized in a storage system by the pump, the storage system comprising the chamber of the pneumatic cylinder and the pump being located so that operation of the pump feeds air into the storage system, the predetermined amount being pressurized to a level by the pump and then remaining substantially constant, such that the addition or removal from the load carrying surface of items of substantially the same height and weight while the predetermined amount is maintained at said level and no fluid or additional gas is added to the storage system and substantially none of the predetermined amount is removed from the storage system causes the shaft to extend or retract by the amount necessary to maintain the top of the load at substantially the same level.

2. The level maintaining system of claim 1, wherein the closed storage system further comprises a storage tank in fluid communication with the chamber of the pneumatic cylinder.

3. The level maintaining system of claim 2, wherein the items are cases of beverages.

4. The level maintaining system of claim 1, wherein the pump is a foot pump.

5. The level maintaining system of claim 1, wherein the volume and pressure relationship for varying amounts of load is determined by the formula $P_1V_1^K=P_2V_2^K$, where $P_1$ and $V_1$ are the pressure and volume values for a first load condition, and $P_2$ and $V_2$ are the pressure and volume values for a second load condition, and K is the compressibility constant for the gas.

6. A transport device comprising:
    a frame;
    a load carrying surface mounted for movement up and down the frame;
    a pneumatic cylinder including a piston, a shaft, and a chamber, said shaft extending out one end of said pneumatic cylinder, the pneumatic cylinder being arranged such that extension and retraction of the shaft controls the height of the load carrying surface;
    a tank in fluid communication with the chamber;
    a pump attached to the frame for introducing a pressurized gas into the tank and the chamber; and
    a pneumatic adjustment subsystem, the pneumatic adjustment subsystem including a predetermined amount of gas that is pressurized in a storage system by the pump, the storage system comprising the chamber of the pneumatic cylinder and the pump being located so that operation of the pump feeds air into the storage system., the predetermined amount being pressurized to a level by the pump and then remaining substantially constant, such that the addition or removal from the load carrying surface of items of substantially the same height and weight while the predetermined amount is maintained at said level and no fluid or additional gas is added to the storage system and substantially none of the predetermined amount is removed from the storage system causes the shaft to extend or retract by the amount necessary to maintain the top of the load at substantially the same level.

7. The transport device of claim 6, wherein the closed during operation storage system further comprises a storage tank in fluid communication with the chamber of the pneumatic cylinder.

8. The transport device of claim 6, wherein the transport device comprises a hand truck.

9. The transport device of claim 8, wherein the hand truck comprises a first roller at the top of the frame and a cable; and wherein the piston of the pneumatic cylinder comprises a second roller attached to its distal end; and wherein a first end of the cable is attached to a fixed surface of the hand truck and the cable wraps around the first and second rollers and is attached at a second end to the carriage.

10. The transport device of claim 9, wherein the predetermined volume further comprises a storage tank linked to the chamber of the pneumatic cylinder.

11. The transport device of claim 6, wherein the items are cases of beverages.

12. The transport device of claim 6, wherein the pump is a foot pump.

13. The level maintaining system of claim 6, wherein the volume and pressure relationship for varying amounts of load is determined by the formula $P_1V_1^K=P_2V_2^K$, where $P_1$ and $V_1$ are the pressure and volume values for a first load condition, and $P_2$ and $V_2$ are the pressure and volume values for a second load condition, and K is the compressibility constant for the gas.

14. A hand truck comprising:
    a frame;
    a load carrying surface mounted for movement up and down the frame;

a pneumatic cylinder including a piston, a shaft, and a chamber, said shaft extending out one end of said pneumatic cylinder, the chamber formed on the side of the piston remote from the shaft, the pneumatic cylinder being arranged such that extension and retraction of the shaft controls the height of the load carrying surface;

a tank linked to the chamber by a conduit;

a pump attached to the frame for introducing a pressurized gas into the tank and the chamber; and a pneumatic adjustment subsystem, the pneumatic subsystem including a predetermined amount of gas that is pressurized in a storage system by the pump, the storage system comprising the tank and a chamber of the pneumatic cylinder on the side of the piston remote from the shaft, and the tank being located in fluid communication between the pump and the chamber, the predetermined amount being pressurized to a level by the pump and then remaining substantially constant, such that the addition or removal from the load carrying surface of items of substantially the same height and weight while the predetermined amount is maintained at said level and no fluid or additional gas is added to the storage system and substantially none of the predetermined amount is removed from the storage system causes the shaft to extend or retract by the amount necessary to maintain the top of the load at substantially the same level.

15. The hand truck of claim 14, wherein the hand truck comprises a first roller at the top of the frame and a cable; and wherein the piston of the pneumatic cylinder comprises a second roller attached to its distal end; and wherein a first end of the cable is attached to a fixed surface of the hand truck and the cable wraps around the first and second rollers and is attached at a second end to the carriage.

16. The transport device of claim 14, wherein the pump is a foot pump.

* * * * *